No. 734,858. PATENTED JULY 28, 1903.
H. HALSEY.
ELECTRIC BATTERY.
APPLICATION FILED AUG. 2, 1902.
NO MODEL.

Witnesses
Robert W. Ireland
George N. Kerr

Henry Halsey Inventor
By his Attorney
C. W. Edwards

No. 734,858. Patented July 28, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 734,858, dated July 28, 1903.

Application filed August 2, 1902. Serial No. 118,028. (No model.)

*To all whom it may concern:*

Be it known that I, HENRY HALSEY, a citizen of the United States, residing at New York city, in the county of New York and State of New York, have invented certain new and useful Improvements in Electric Batteries, of which the following is a full, clear, and exact specification.

This invention relates to electric batteries, and especially to that class of batteries wherein one of the elements is a movable element.

The object of the invention is to provide a battery of simple mechanical construction which shall be of high electrical efficiency. In batteries of this general class heretofore described by me one or more of the elements are movable in an electrolyte, to which electrolyte is fed a depolarizing agent. The depolarizing agent, however, has heretofore been intermingled with the electrolyte. In the present application the electrolyte and the depolarizing agent are separated by a porous diaphragm, and the movable element is located either in the electrolyte or in the depolarizing agent.

The invention will be more fully described with reference to the accompanying drawings, in which—

Figure 1:
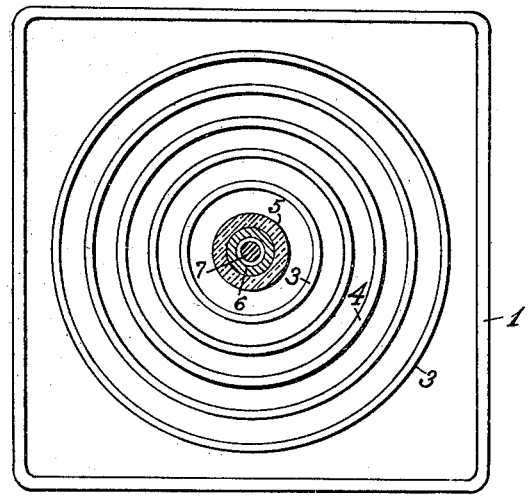
Figure 2:
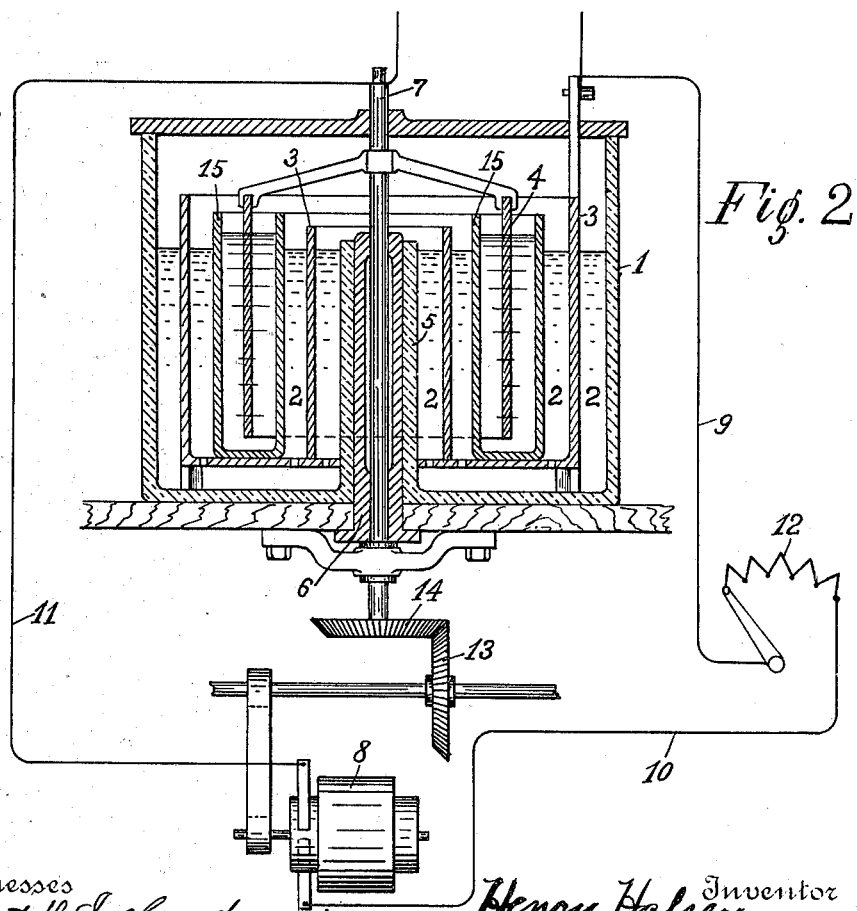

Figure 1 is a plan elevation of a battery embodying my invention. Fig. 2 is a side elevation of the same.

Referring more particularly to the drawings, 1 represents a suitable case containing the electrolyte 2; 3 represents one of the elements of the battery, in this instance the positive element, and 4 represents the opposite element, in this instance the carbon element.

In the construction shown in Figs. 1 and 2 of the drawings the case 1 is provided with a reëntrant portion 5, in which a bearing 6 for the shaft 7 is mounted. Upon shaft 7 is carried the element 4, which is cylindrical in shape and is interposed between the opposite cylindrical portions of the positive element 3. The shaft 7 is arranged to be rotated by any suitable means—such, for example, as the electric motor 8, operated by a circuit 9 10 11, controlled by resistance-controller 12. The motor in this instance is geared to the shaft 7 by gears 13 and 14. A porous cup 15, annular in form, is located within the cylindrical portions of the element 3 and itself surrounds and contains the element 4. The depolarizing agent—for example, a solution of bichromate of potash—is contained in the porous cup 15.

In the operation of the battery, therefore, the carbon element is not in direct contact with the electrolyte, but is surrounded by the depolarizer. The initial current of the battery is sufficient to operate the motor 8, which in turn drives shaft 7, and thus revolves the element 4 in the depolarizing liquid. The element 4 being maintained in motion, the output of the battery will not fall below the initial current, but, on the contrary, will be maintained constant or even increased over the initial if the speed be increased.

It will be seen that in the type of battery herein illustrated and described the internal resistance will be reduced to a minimum, and, in fact, polarization of the battery is practically impossible.

It will be understood that the mechanical arrangement of the parts of the battery may be varied at will without departing from the spirit of my invention. The composition and relative arrangement of the electrolyte, depolarizer, and the elements may also be varied to meet individual conditions.

The depolarizer may surround the negative element and the electrolyte the positive element—for example, the electrolyte and the depolarizer may be placed in exactly the opposite compartments from the ones shown in the drawings.

Having thus described my invention, I declare that what I claim as new, and desire to secure by Letters Patent, is—

1. In a battery, the combination with the case, of two cylindrical elements one within the other, a porous cup surrounding one of said elements, a depolarizer in said cup, an electrolyte surrounding the other element, and means for maintaining movement of the element in the depolarizer, substantially as described.

2. In a battery, the combination with the case, of two cylindrical elements, one of which comprises two cylindrical parts surrounding the other element, an annular porous cup between said parts of one element and containing the other element, a depolarizer in said cup, and an electrolyte surrounding the other element, substantially as described.

3. In a battery, the combination with the case, of two cylindrical elements, one of which comprises two cylindrical parts surrounding the other element, an annular porous cup between said parts of one element and containing the other element, a depolarizer in said cup an electrolyte surrounding the other element, and means for maintaining movement of the element in the depolarizer, substantially as described.

4. In a battery, the combination with a case having a reëntrant portion, an element, and an electrolyte, of a shaft supported by said reëntrant portion carrying an element, one element being immersed in a porous cup containing a fluid, substantially as described.

5. In a battery, the combination with a case having a reëntrant portion, an element, and an electrolyte, of a rotary shaft supported by said reëntrant portion carrying a cylindrical element, said element being immersed in a porous cup containing a fluid, substantially as described.

6. In a battery, the combination with a case having a reëntrant portion, a cylindrical element, and an electrolyte, of a rotary shaft supported by said reëntrant portion carrying a cylindrical element, one element surrounding the other and one element immersed in a porous cup containing a fluid, substantially as described.

In testimony whereof I affix my signature in presence of two witnesses.

HENRY HALSEY.

Witnesses:
 ROBERT D. IRELAND,
 LESTER C. TAYLOR.